US011364921B2

(12) United States Patent
Mukai

(10) Patent No.: US 11,364,921 B2
(45) Date of Patent: Jun. 21, 2022

(54) OBJECT RECOGNITION APPARATUS, OBJECT RECOGNITION METHOD, AND VEHICLE

(71) Applicant: HONDA MOTOR CO., LTD., Tokyo (JP)

(72) Inventor: Takuyuki Mukai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 756 days.

(21) Appl. No.: 16/199,616

(22) Filed: Nov. 26, 2018

(65) Prior Publication Data
US 2019/0176839 A1 Jun. 13, 2019

(30) Foreign Application Priority Data

Dec. 13, 2017 (JP) .............................. JP2017-238857

(51) Int. Cl.
B60W 50/02 (2012.01)
G05D 1/02 (2020.01)
(Continued)

(52) U.S. Cl.
CPC ....... *B60W 50/0205* (2013.01); *G05D 1/0088* (2013.01); *G05D 1/0246* (2013.01);
(Continued)

(58) Field of Classification Search
CPC ...... B60W 50/0205; B60W 2050/0215; G05D 1/0088; G05D 1/0246; G05D 1/0257;
(Continued)

(56) References Cited

U.S. PATENT DOCUMENTS 9,783,197 B2   10/2017  Aoki et al.
2016/0288790 A1   10/2016  Aoki et al.
2017/0307751 A1 * 10/2017  Rohani ................. G01S 13/865

FOREIGN PATENT DOCUMENTS

JP    2007-176265 A      7/2007
JP    2007176265 A  *   7/2007
(Continued)

OTHER PUBLICATIONS

Japanese Office Action (w/ partial translation) issued for Japanese Patent Application No. 2017-238857 dated Jul. 5, 2019.

*Primary Examiner* — Charles J Han
(74) *Attorney, Agent, or Firm* — Thomas | Horstemeyer, LLP

(57) ABSTRACT

An object recognition apparatus for recognizing an object is provided. The apparatus includes first and second object determinations units configured to determine the object based on at least detection results of the object by first and second sensors and at least detection results of the object by third and fourth sensors, respectively; an object recognition unit configured to recognize the object based on a determination result by the first and/or second object determination unit; first and second calculation units configured to calculate a difference between the detection result by the first sensor and the detection result by the second sensor and a difference between the detection results by the third and fourth sensor, respectively; and a reliability decision unit configured to decide reliabilities of the determination results by the object determination units based on calculation results by the calculation units.

8 Claims, 6 Drawing Sheets

(51) Int. Cl.
  *G05D 1/00* (2006.01)
  *G06K 9/62* (2022.01)
  *G06V 20/58* (2022.01)

(52) U.S. Cl.
  CPC ......... *G05D 1/0257* (2013.01); *G06K 9/6293* (2013.01); *G06V 20/58* (2022.01); *B60W 2050/0215* (2013.01)

(58) Field of Classification Search
  CPC .............. G06K 9/00805; G06K 9/6293; H04L 65/1069; H04M 3/42059; H04M 7/0036; H04M 7/0057; H04M 7/0075
  See application file for complete search history.

(56) References Cited

FOREIGN PATENT DOCUMENTS

| | | | |
|---|---|---|---|
| JP | 2016-190519 A | | 11/2016 |
| JP | 2017-202802 A | | 11/2017 |
| JP | 2018045273 A | * | 3/2018 |

* cited by examiner

OBJECT RECOGNITION APPARATUS, OBJECT RECOGNITION METHOD, AND VEHICLE

CROSS-REFERENCE TO RELATED APPLICATION(S)

This application claims priority to and the benefit of Japanese Patent Application No. 2017-238857 filed on Dec. 13, 2017, the entire disclosure of which is incorporated herein by reference.

BACKGROUND OF THE INVENTION

Field of the Invention

The present invention relates to an object recognition apparatus, an object recognition method, and a vehicle.

Description of the Related Art

Various techniques related to automated driving of a vehicle have been developed. Japanese Patent Laid-Open No. 2007-176265 describes a technique of determining, based on peripheral traveling environment information detected by a radar sensor and a CCD camera mounted on a vehicle, whether there is an obstacle ahead. The reliability of acquired information about the peripheral status detected by the radar sensor and the reliability of acquired information about the peripheral status detected by the CCD camera are calculated. These reliabilities are calculated to be higher as the degree of matching between the sizes, positions, and the like of obstacles detected by the radar sensor and the CCD camera, respectively, is higher.

SUMMARY OF THE INVENTION

When there are a plurality of systems of determination units each for determining an object by integrating the detection results of a plurality of sensors, determination results may differ from each other. In the conventional method, in this case, it is difficult to perform object recognition with high reliability. Some aspects of the present invention perform object recognition with high reliability.

According to some embodiments, there is provided an object recognition apparatus for recognizing an object, comprising: a first object determination unit configured to determine the object based on at least detection results of the object by a first sensor and a second sensor; a second object determination unit configured to determine the object based on at least detection results of the object by a third sensor and a fourth sensor; an object recognition unit configured to recognize the object based on a determination result by at least one of the first object determination unit or the second object determination unit; a first calculation unit configured to calculate a difference between the detection result by the first sensor and the detection result by the second sensor; a second calculation unit configured to calculate a difference between the detection result by the third sensor and the detection result by the fourth sensor; and a reliability decision unit configured to decide reliabilities of the determination results by the first object determination unit and the second object determination unit based on calculation results by the first calculation unit and the second calculation unit.

Further features of the present invention will become apparent from the following description of exemplary embodiments with reference to the attached drawings.

DESCRIPTION OF THE EMBODIMENTS

Figure 1:
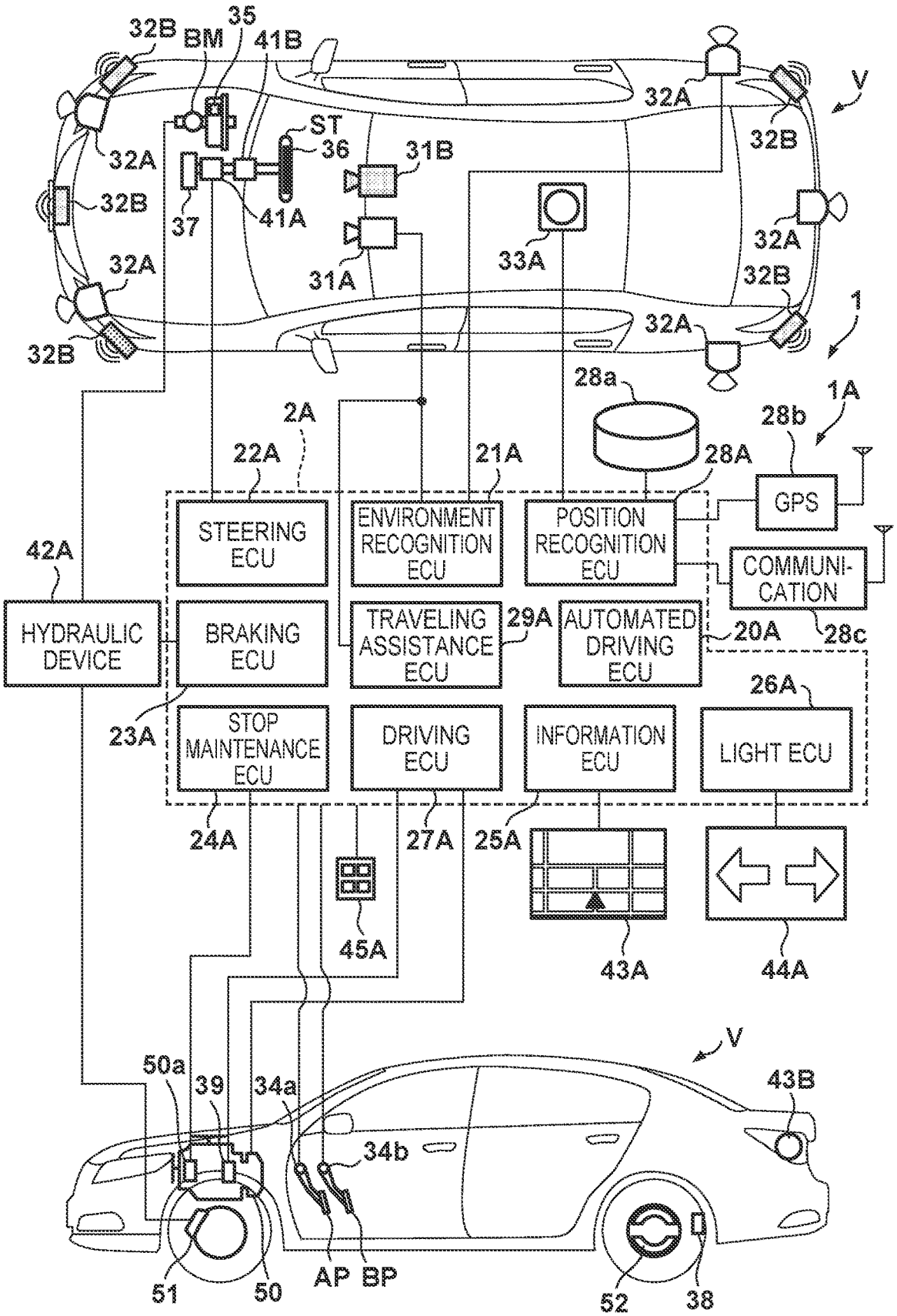
FIG. 1 is a block diagram showing a vehicle control system according to an embodiment.
Figure 2:
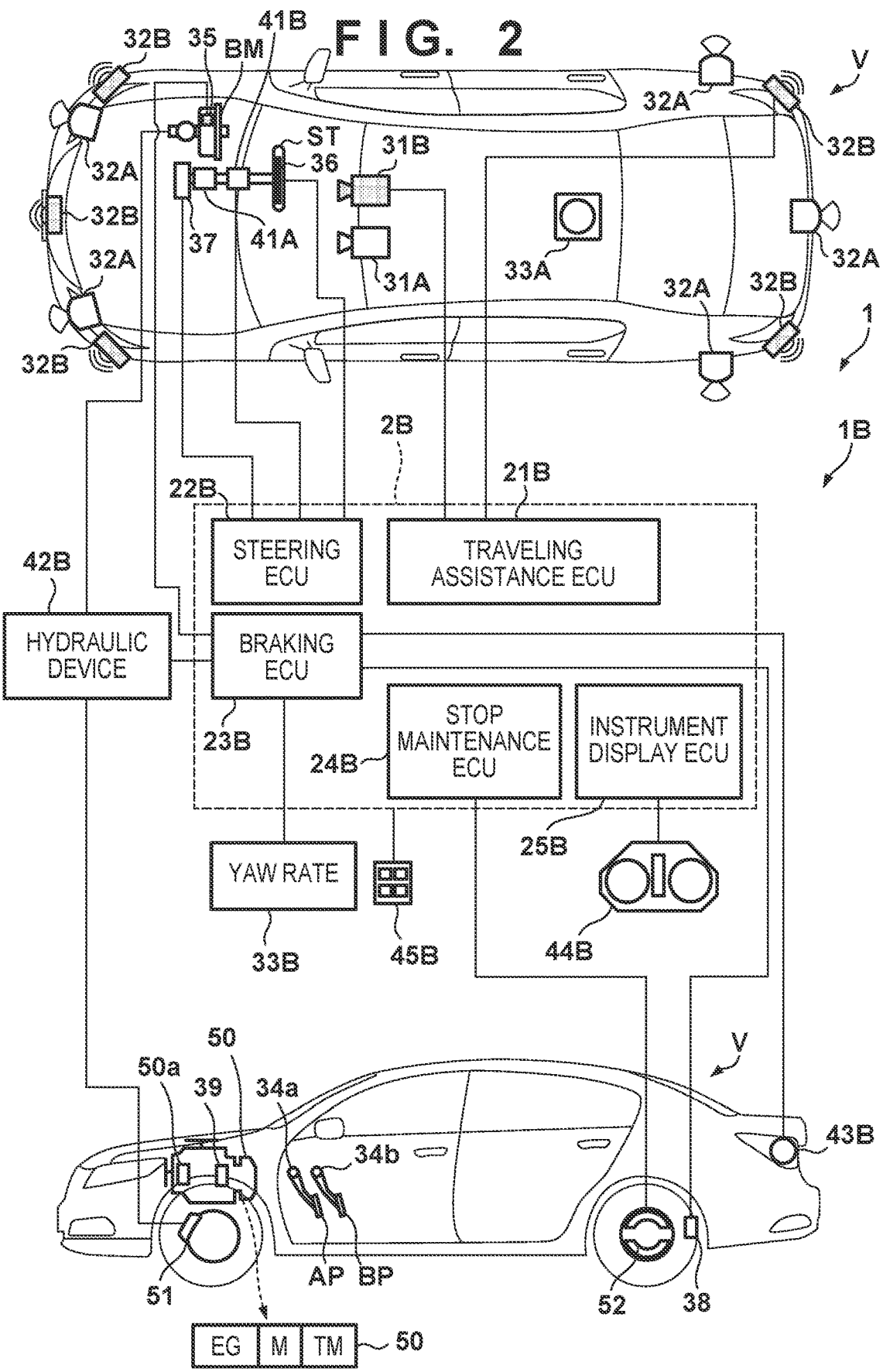
FIG. 2 is a block diagram showing the vehicle control system according to the embodiment.
Figure 3:
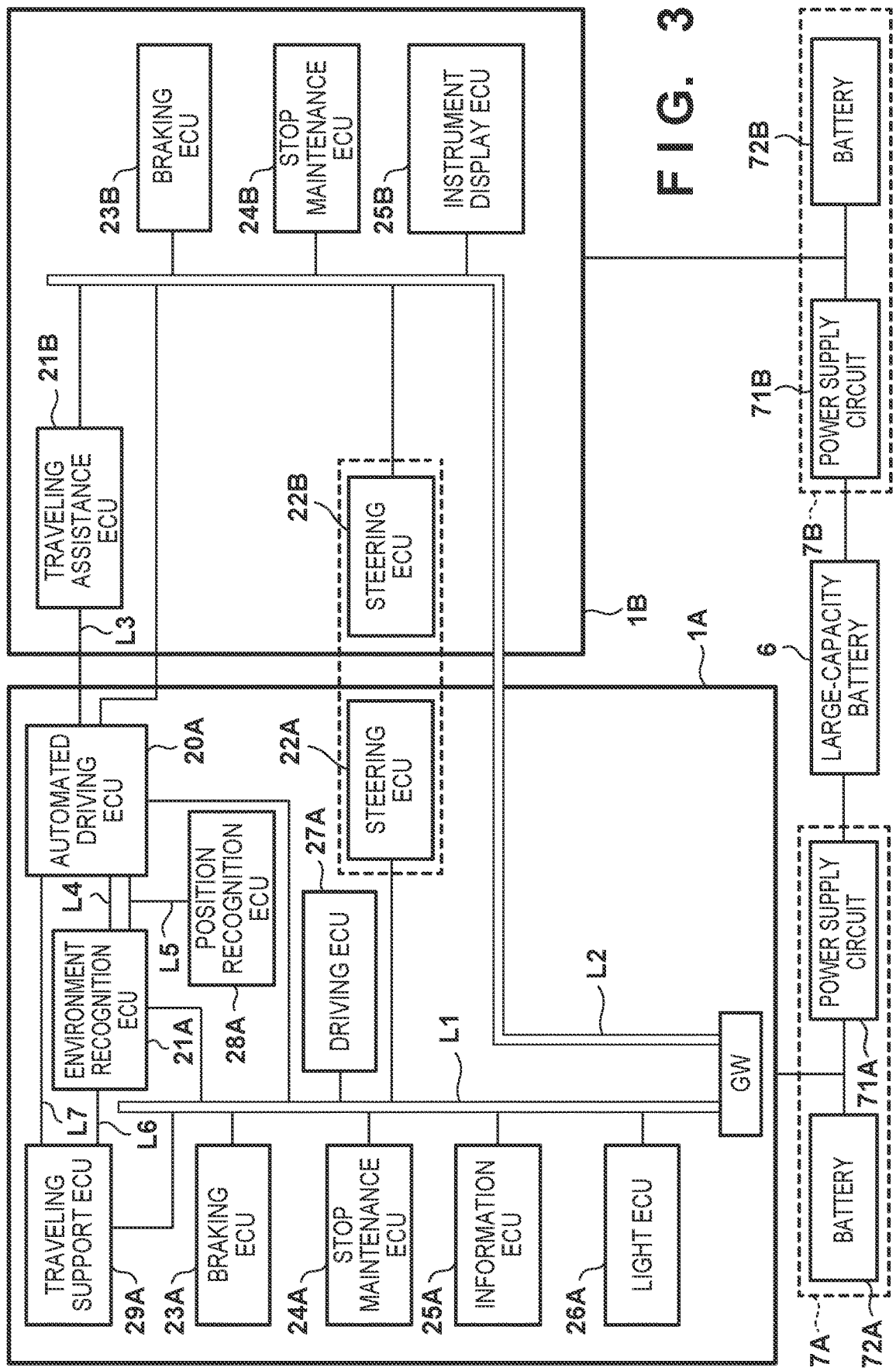
FIG. 3 is a block diagram showing the vehicle control system according to the embodiment.

FIGS. 1 to 4 are block diagrams each showing a vehicle control system 1 according to an embodiment of the present invention. The control system 1 controls a vehicle V. Referring to FIGS. 1 and 2, plan views and side views show an outline of the vehicle V. As an example, the vehicle V is a sedan-type four-wheeled vehicle. The control system 1 includes control apparatuses 1A and 1B. FIG. 1 is a block diagram showing the control apparatus 1A, and FIG. 2 is a block diagram showing the control apparatus 1B. FIG. 3 mainly shows the arrangement of power supplies and communication lines between the control apparatuses 1A and 1B.

The control apparatuses 1A and 1B multiplex some of functions implemented by the vehicle V or make some of the functions redundant. This can improve the reliability of the system. The control apparatus 1A performs, for example, traveling assistance control concerning risk avoidance or the like in addition to automated driving control and normal operation control in manual driving. The control apparatus 1B mainly manages traveling assistance control concerning risk avoidance or the like. Traveling assistance will be sometimes referred to as driving assistance hereinafter. By making functions redundant in the control apparatuses 1A and 1B and causing them to perform different control processes, it is possible to distribute control processing and improve the reliability.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M can be used as a driving source that accelerates the vehicle V and also used as an electric generator at the time of deceleration or the like (regenerative braking).

<Control Apparatus 1A>

The arrangement of the control apparatus 1A will be described with reference to FIG. 1. The control apparatus 1A includes an ECU group (control unit group) 2A. The ECU group 2A includes a plurality of ECUs 20A to 29A. Each ECU includes a processor represented by a CPU, a storage device such as a semiconductor memory, and an interface with an external device. The storage device stores a program to be executed by the processor, data to be used by the processor for processing, and the like. Each ECU may include a plurality of processors, a plurality of storage devices, and a plurality of interfaces. Note that the number of ECUs and functions provided by the ECUs can be designed appropriately, and the ECUs can be subdivided or integrated, as compared to this embodiment. Note that FIGS.

1 and 3 show the names of the representative functions of the ECUs 20A to 29A. For example, the ECU 20A is represented as an "automated driving ECU".

The ECU 20A executes control concerning automated driving as traveling control of the vehicle V. In automated driving, at least one of driving (acceleration of the vehicle V by the power plant 50 or the like), steering, or braking of the vehicle V is automatically performed regardless of a driving operation of a driver. In this embodiment, driving, steering, and braking are automatically performed.

The ECU 21A serves as an environment recognition unit that recognizes the traveling environment of the vehicle V based on the detection results of detection units 31A and 32A for detecting the peripheral status of the vehicle V. The ECU 21A generates target data (to be described later) as peripheral environment information.

In this embodiment, the detection unit 31A serves as an image capturing device (to be sometimes referred to as the camera 31A hereinafter) that detects an object around the vehicle V by image capturing. The camera 31A is provided on the roof front of the vehicle V so as to capture the front side of the vehicle V. When an image captured by the camera 31A is analyzed, the contour of a target or a division line (a white line or the like) of a lane on a road can be extracted.

In this embodiment, the detection unit 32A serves as a LiDAR (Light Detection and Ranging) (to be sometimes referred to as the LiDAR 32A hereinafter) that detects an object around the vehicle V using light, and detects a target around the vehicle V and measures a distance to the target. In this embodiment, five LiDARs 32A are provided; one at each corner of the front portion of the vehicle V, one at the center of the rear portion, and one on each side of the rear portion. The number of LiDARs 32A and their arrangement can be selected appropriately.

The ECU 29A serves as a traveling assistance unit that executes control concerning traveling assistance (in other words, driving assistance) as traveling control of the vehicle V based on the detection result of the detection unit 31A.

The ECU 22A serves as a steering control unit that controls an electric power steering device 41A. The electric power steering device 41A includes a mechanism that steers front wheels in accordance with a driving operation (steering operation) of the driver on a steering wheel ST. The electric power steering device 41A includes a motor that generates a driving force to assist the steering operation or automatically steer the front wheels, a sensor that detects the rotation amount of a motor, and a torque sensor that detects a steering torque applied to the driver.

The ECU 23A serves as a braking control unit that controls a hydraulic device 42A. The hydraulic device 42A implements, for example, an ESB (Electric Servo Brake). A braking operation of the driver on a brake pedal BP is converted into a hydraulic pressure in a brake master cylinder BM, and transferred to the hydraulic device 42A. The hydraulic device 42A is an actuator that can control, based on the hydraulic pressure transferred from the brake master cylinder BM, the hydraulic pressure of hydraulic oil to be supplied to a brake device (for example, a disc brake device) 51 provided in each of the four wheels, and the ECU 23A controls driving of a solenoid valve or the like provided in the hydraulic device 42A. In this embodiment, the ECU 23A and the hydraulic device 42A form an electric servo brake, and the ECU 23A controls distribution of, for example, braking forces generated by the four brake devices 51 and a braking force generated by regenerative braking of the motor M.

The ECU 24A serves as a stop maintenance control unit that controls an electric parking lock device 50a provided in the automatic transmission TM. The electric parking lock device 50a mainly includes a mechanism that locks the internal mechanism of the automatic transmission TM at the time of selection of a P range (parking range). The ECU 24A can control locking and unlocking by the electric parking lock device 50a.

The ECU 25A serves as an in-vehicle notification control unit that controls an information output device 43A for making a notification of information inside the vehicle. The information output device 43A includes, for example, a voice output device and a display device such as a head-up display. The information output device 43A may further include a vibration device. The ECU 25A causes the information output device 43A to output, for example, various kinds of information such as a vehicle speed and an outside air temperature and information such as route guidance.

The ECU 26A serves as an outside-vehicle notification control unit that controls an information output device 44A for making a notification of information outside the vehicle. In this embodiment, the information output device 44A is a direction indicator (hazard lamp), and the ECU 26A can make a notification of the traveling direction of the vehicle V outside the vehicle by controlling blinking of the information output device 44A as a direction indicator, and enhance the attentiveness to the vehicle V outside the vehicle by controlling blinking of the information output device 44A as a hazard lamp.

The ECU 27A serves as a driving control unit that controls the power plant 50. In this embodiment, one ECU 27A is assigned to the power plant 50 but respective ECUs may be assigned to each of the internal combustion engine EG, the motor M, and the automatic transmission TM. The ECU 27A controls the outputs of the internal combustion engine EG and motor M and switches the gear range of the automatic transmission TM in accordance with a driving operation of the driver, the vehicle speed, and the like detected by an operation detection sensor 34a provided in an accelerator pedal AP and an operation detection sensor 34b provided in the brake pedal BP. Note that a rotation speed sensor 39 that detects the rotation speed of the output shaft of the automatic transmission TM is provided, in the automatic transmission TM, as a sensor that detects the traveling state of the vehicle V. The vehicle speed of the vehicle V can be calculated based on the detection result of the rotation speed sensor 39.

The ECU 28A serves as a position recognition unit that recognizes the current position and course of the vehicle V. The ECU 28A controls a gyro sensor 33A, a GPS sensor 28b, and a communication device 28c, and performs information processing of a detection result or a communication result. The gyro sensor 33A detects a rotary motion of the vehicle V. The course of the vehicle V can be determined based on the detection result of the gyro sensor 33A and the like. The GPS sensor 28b detects the current position of the vehicle V. The communication device 28c performs wireless communication with a server that provides map information or traffic information and acquires these pieces of information. A database 28a can store high-precision map information, and the ECU 28A can specify the position of the vehicle V on the lane more precisely based on the map information and the like.

An input device 45A is arranged in the vehicle so as to be operable by the driver, and accepts input of an instruction or information from the driver.

<Control Apparatus 1B>

The arrangement of the control apparatus 1B will be described with reference to FIG. 2. The control apparatus 1B includes an ECU group (control unit group) 2B. The ECU group 2B includes a plurality of ECUs 21B to 25B. Each ECU includes a processor represented by a CPU, a storage device such as a semiconductor memory, and an interface with an external device. The storage device stores a program to be executed by the processor, data to be used by the processor for processing, and the like. Each ECU may include a plurality of processors, a plurality of storage devices, and a plurality of interfaces. Note that the number of ECUs and functions provided by the ECUs can be designed appropriately, and the ECUs can be subdivided or integrated, as compared to this embodiment. Note that FIGS. 2 and 3 show the names of the representative functions of the ECUs 21B to 25B, similarly to the ECU group 2A.

The ECU 21B serves as an environment recognition unit that recognizes the traveling environment of the vehicle V based on the detection results of detection units 31B and 32B for detecting the peripheral status of the vehicle V, and also serves as a traveling assistance unit that executes control concerning traveling assistance (in other words, driving assistance) as traveling control of the vehicle V. The ECU 21B generates target data (to be described later) as peripheral environment information.

Note that in this embodiment, the ECU 21B is configured to have the environment recognition function and the traveling assistance function. However, an ECU may be provided for each function, like the ECUs 21A and 29A of the control apparatus 1A. To the contrary, the control apparatus 1A may have an arrangement in which the functions of the ECUs 21A and 29A are implemented by one ECU, like the ECU 21B.

In this embodiment, the detection unit 31B serves as an image capturing device (to be sometimes referred to as the camera 31B hereinafter) that detects an object around the vehicle V by image capturing. The camera 31B is provided on the roof front of the vehicle V so as to capture the front side of the vehicle V. When an image captured by the camera 31B is analyzed, the contour of a target or a division line (a white line or the like) of a lane on a road can be extracted. In this embodiment, the detection unit 32B serves as a millimeter wave radar (to be sometimes referred to as the radar 32B hereinafter) that detects an object around the vehicle V using a radio wave, and detects a target around the vehicle V or measures a distance to a target. In this embodiment, five radars 32B are provided; one at the center of the front portion of the vehicle V, one at each corner of the front portion, and one at each corner of the rear portion. The number of radars 32B and their arrangement can be selected appropriately.

The ECU 22B serves as a steering control unit that controls an electric power steering device 41B. The electric power steering device 41B includes a mechanism that steers the front wheels in accordance with a driving operation (steering operation) of the driver on the steering wheel ST. The electric power steering device 41B includes a motor that generates a driving force to assist the steering operation or automatically steer the front wheels, a sensor that detects the rotation amount of a motor, and a torque sensor that detects a steering torque applied to the driver. A steering angle sensor 37 is electrically connected to the ECU 22B via a communication line L2 (to be described later), and it is possible to control the electric power steering device 41B based on the detection result of the steering angle sensor 37. The ECU 22B can acquire the detection result of a sensor 36 that detects whether the driver grips the steering wheel ST, and can monitor the gripping state of the driver.

The ECU 23B serves as a braking control unit that controls a hydraulic device 42B. The hydraulic device 42B implements, for example, VSA (Vehicle Stability Assist). A braking operation of the driver on the brake pedal BP is converted into a hydraulic pressure in the brake master cylinder BM, and transferred to the hydraulic device 42B. The hydraulic device 42B is an actuator that can control, based on the hydraulic pressure transferred from the brake master cylinder BM, the hydraulic pressure of hydraulic oil to be supplied to the brake device 51 of each wheel, and the ECU 23B controls driving of a solenoid valve or the like provided in the hydraulic device 42B.

In this embodiment, wheel speed sensors 38 respectively provided in the four wheels, a yaw rate sensor 33B, and a pressure sensor 35 that detects a pressure in the brake master cylinder BM are electrically connected to the ECU 23B and the hydraulic device 42B, thereby implementing, based on the detection results of these sensors, an ABS function, traction control, and a function of controlling the orientation of the vehicle V. For example, the ECU 23B adjusts the braking force of each wheel based on the detection result of the wheel speed sensor 38 provided in each of the four wheels, thereby suppressing sliding of each wheel. In addition, the braking force of each wheel is adjusted based on the rotation angular velocity around the vertical axis of the vehicle V, that has been detected by the yaw rate sensor 33B, thereby suppressing an abrupt change in orientation of the vehicle V.

The ECU 23B also functions as an outside-vehicle notification control unit that controls an information output device 43B for making a notification of information outside the vehicle. In this embodiment, the information output device 43B serves as a brake lamp, and the ECU 23B can turn on the brake lamp at the time of braking or the like. This can enhance the attentiveness of a following vehicle to the vehicle V.

The ECU 24B serves as a stop maintenance control unit that controls an electric parking brake device (for example, a drum brake) 52 provided in a rear wheel. The electric parking brake device 52 includes a mechanism that locks the rear wheel. The ECU 24B can control locking and unlocking of the rear wheel by the electric parking brake device 52.

The ECU 25B serves as an in-vehicle notification control unit that controls an information output device 44B for making a notification of information inside the vehicle. In this embodiment, the information output device 44B includes a display device arranged in an instrument panel. The ECU 25B can cause the information output device 44B to output various kinds of information such as a vehicle speed and fuel consumption.

An input device 45B is arranged in the vehicle so as to be operable by the driver, and accepts input of an instruction or information from the driver.

<Communication Line>

Examples of communication lines of the control system 1, that communicably connect the ECUs, will be described with reference to FIG. 3. The control system 1 includes wired communication lines L1 to L7. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 connects the ECUs 20A and 21B. The communication line L5 connects the ECUs 20A, 21A, and 28A. The communication line L6 connects the ECUs 29A and 21A. The communication line L7 connects the ECUs 29A and 20A.

The communication lines L1 to L7 may use the same protocol or different protocols, and may use different protocols in accordance with a communication environment such as a communication speed, communication amount, or durability. For example, the communication lines L3 and L4 may use Ethernet® in terms of the communication speed. For example, the communication lines L1, L2 and L5 to L7 may use CAN.

The control apparatus 1A includes a gateway GW. The gateway GW relays the communication lines L1 and L2. Therefore, for example, the ECU 21B can output a control command to the ECU 27A via the communication line L2, the gateway GW, and the communication line L1.

<Power Supply>

The power supply of the control system 1 will be described with reference to FIG. 3. The control system 1 includes a large-capacity battery 6 and power supplies 7A and 7B. The large-capacity battery 6 is a battery that is used to drive the motor M and is charged by the motor M.

The power supply 7A is a power supply that supplies power to the control apparatus 1A, and includes a power supply circuit 71A and a battery 72A. The power supply circuit 71A is a circuit that supplies power of the large-capacity battery 6 to the control apparatus 1A, and lowers, for example, the output voltage (for example, 190 V) of the large-capacity battery 6 to a reference voltage (for example, 12 V). The battery 72A is, for example, a 12-V lead battery. By providing the battery 72A, it is possible to supply power to the control apparatus 1A even if power supply of the large-capacity battery 6 or the power supply circuit 71A is disconnected or decreases.

The power supply 7B is a power supply that supplies power to the control apparatus 1B, and includes a power supply circuit 71B and a battery 72B. The power supply circuit 71B is a circuit similar to the power supply circuit 71A, and a circuit that supplies power of the large-capacity battery 6 to the control apparatus 1B. The battery 72B is a battery similar to the battery 72A, and is, for example, a 12-V lead battery. By providing the battery 72B, it is possible to supply power to the control apparatus 1B even if power supply of the large-capacity battery 6 or the power supply circuit 71B is disconnected or decreases.

<Overall Arrangement>

Figure 4:
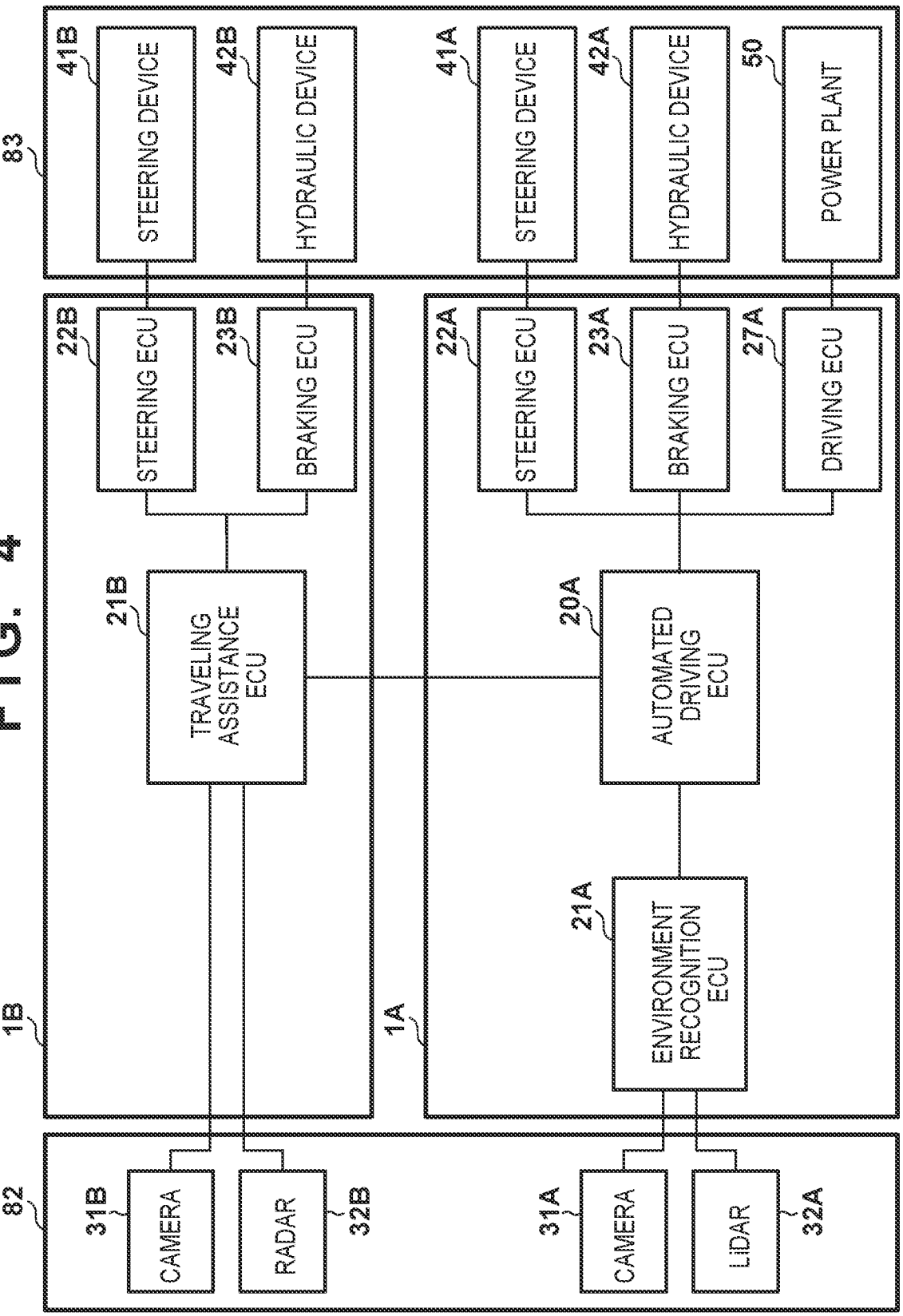
FIG. 4 is a block diagram showing the vehicle control system according to the embodiment.

The overall arrangement of the vehicle V will be described from another viewpoint with reference to FIG. 4. The vehicle V includes the control apparatuses 1A and 1B, an external recognition apparatus group 82, and an actuator group 83.

The external recognition apparatus group 82 is a set of external recognition apparatuses (sensors) mounted on the vehicle V. The external recognition apparatus group 82 includes the above-described cameras 31A and 31B, LiDAR 32A, and radar 32B. The camera 31A and the LiDAR 32A are connected to the ECU 20A via the ECU 21A. Pieces of external information obtained by the camera 31A and the LiDAR 32A are supplied to the ECU 20A, and the camera 31A and the LiDAR 32A operate in accordance with an instruction from the ECU 20A. The camera 31B and the radar 32B are connected to the ECU 21B. Pieces of external information obtained by the camera 31B and the radar 32B are supplied to the ECU 21B, and the camera 31B and the radar 32B operate in accordance with an instruction from the ECU 21B. The ECU 21B may supply the pieces of external information obtained by the camera 31B and the radar 32B to the ECU 20A. This enables the ECU 20A to execute control of automated driving using the pieces of external information respectively obtained from the cameras 31A and 31B, LiDAR 32A, and radar 32B. The cameras 31A and 31B have the same detection characteristic. For example, the cameras 31A and 31B are to detect visible light.

The actuator group 83 is a set of actuators mounted on the vehicle V. The actuator group 83 includes the above-described electric power steering devices 41A and 41B, hydraulic devices 42A and 42B, and power plant 50. The electric power steering device 41A, the hydraulic device 42A, and the power plant 50 are connected to the ECU 20A via the ECUs 22A, 23A, and 27A, respectively. Instead, the ECU 20A may be connected to only some of the electric power steering device 41A, the hydraulic device 42A, and the power plant 50. The electric power steering device 41A, the hydraulic device 42A, and the power plant 50 operate in accordance with an instruction from the ECU 20A. The electric power steering device 41B and the hydraulic device 42B are connected to the ECU 21B via the ECUs 22B and 23B, respectively. Instead, the ECU 21B may be connected to only one of the electric power steering device 41B and the hydraulic device 42B. The electric power steering device 41B and the hydraulic device 42B operate in accordance with an instruction from the ECU 21B.

The power plant 50 drives the vehicle V, and is thus a kind of longitudinal control actuator. Furthermore, the power plant 50 can change the direction of the vehicle V by changing the distribution of the driving forces of the left and right wheels, and is thus a kind of lateral control actuator. Each of the hydraulic devices 42A and 42B performs braking of the vehicle V, and is thus a kind of longitudinal control actuator. Furthermore, each of the hydraulic devices 42A and 42B can change the direction of the vehicle V by brake torque vectoring, and is thus a kind of lateral control actuator. Each of the electric power steering devices 41A and 41B controls steering of the vehicle V, and is thus a kind of lateral control actuator.

The ECU 20A communicates with part (camera 31A and LiDAR 32A) of the external recognition apparatus group 82 through a communication path, and communicates with part (electric power steering device 41A, hydraulic device 42A, and power plant 50) of the actuator group 83 through another communication path. The ECU 21B communicates with part (camera 31B and radar 32B) of the external recognition apparatus group 82 through a communication path, and communicates with part (electric power steering device 41B and hydraulic device 42B) of the actuator group 83 through another communication path. The communication path connected to the ECU 20A may be different from that connected to the ECU 21B. These communication paths use, for example, CAN (Controller Area Network) but may use Ethernet®. The ECUs 20A and 21B are interconnected via a communication path. This communication path uses, for example, CAN (Control Area Network) but may use Ethernet. Alternatively, the ECUs 20A and 21B may be interconnected by both CAN and Ethernet.

<Control Example>

Figure 5:
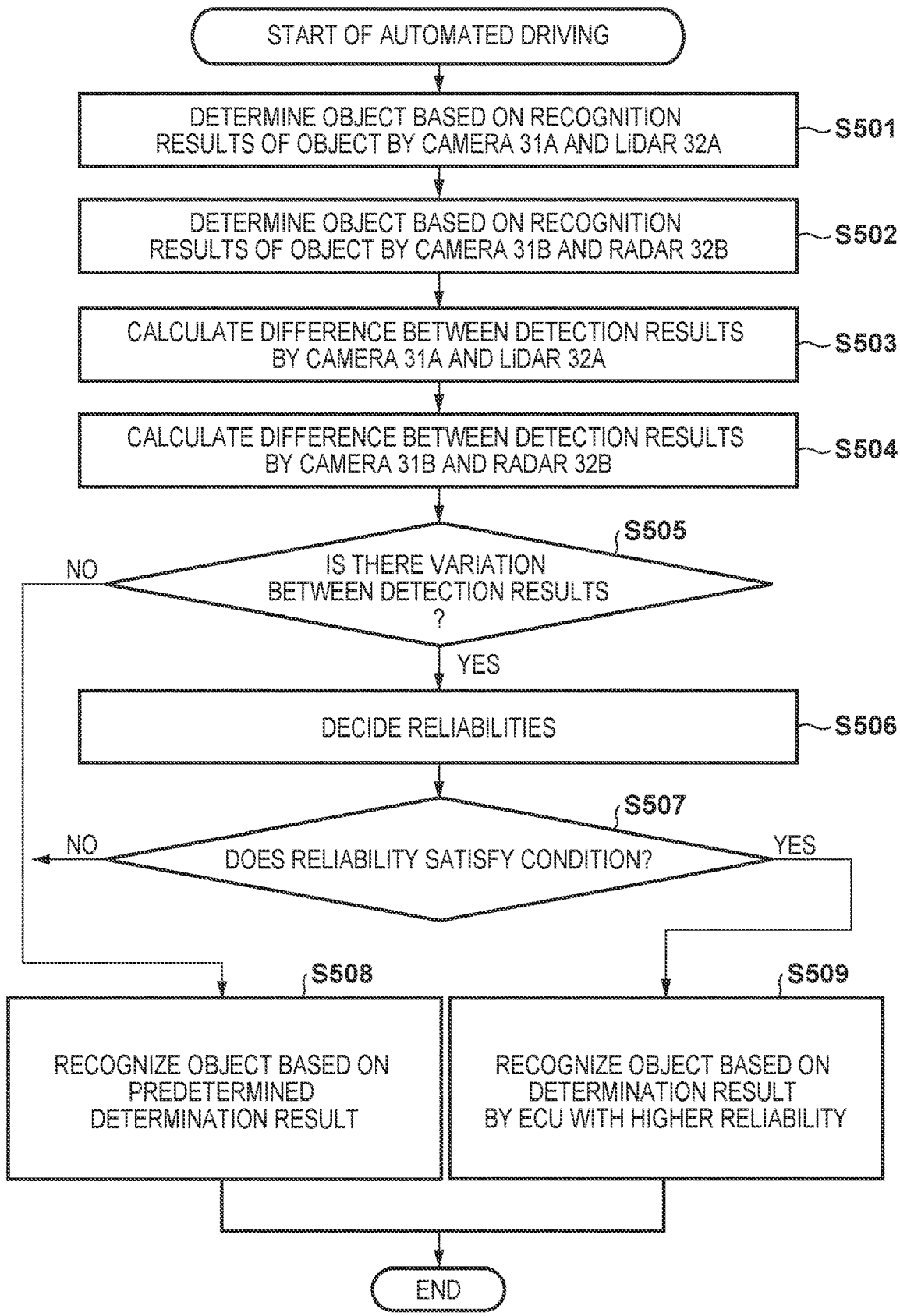
FIG. 5 is a flowchart for explaining an object recognition method according to the embodiment.
Figure 6:
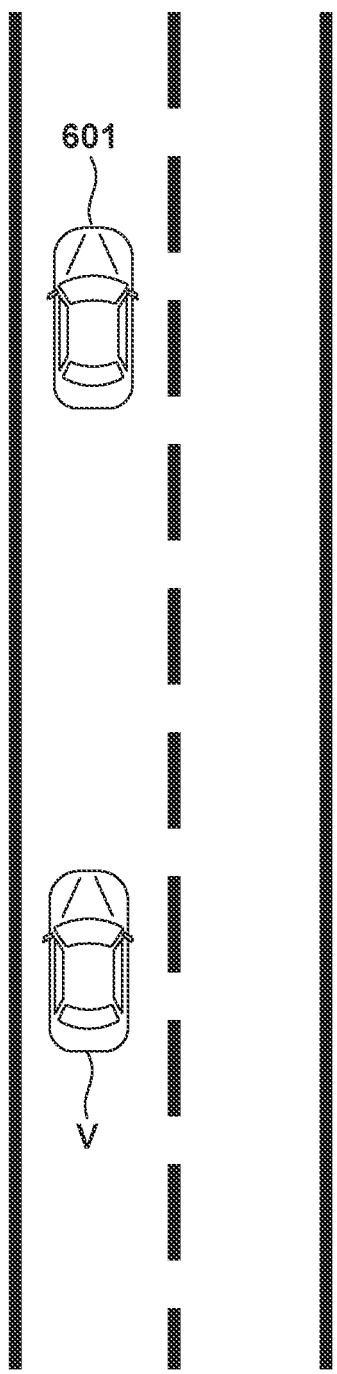
FIG. 6 is a schematic view for explaining an object outside a self-vehicle according to the embodiment.

A method for recognizing an object in the vehicle V will be described with reference to FIG. 5. The above-described control system 1 executes this method. That is, the control system 1 can be referred to as an object recognition apparatus. An object to be recognized is an object outside the vehicle V, and includes, for example, another vehicle, a pedestrian, and a fixed obstacle (guardrail or the like) located around the vehicle V. In the following description, a preceding vehicle 601 is processed as an example of the object. For example, this method is executed repetitively (for example, at a period of 1 ms) during automated driving of the vehicle V. The ECU 20A performs automated driving based on an object recognition result. If there are a plurality of objects around the vehicle V, the following processing may be performed for each object.

In step S501, the ECU 21A determines the preceding vehicle 601 based on at least the detection results of the preceding vehicle 601 by the camera 31A and the LiDAR 32A. In this processing, the ECU 21A functions as an object recognition unit. The detection result of the preceding vehicle 601 by the camera 31A includes, for example, the distance between the vehicle V and the preceding vehicle 601, the size (width and height) of the preceding vehicle 601, and the speed of the preceding vehicle 601. The detection result of the preceding vehicle 601 by the LiDAR 32A can include the same information. Determination of the preceding vehicle 601 includes determination of the distance to the preceding vehicle 601, the size of the preceding vehicle 601, and the speed of the preceding vehicle 601 by, for example, integrating the detection results by the camera 31A and the LiDAR 32A. Instead of the ECU 21A, for example, the ECU 20A may perform step S501.

In step S502, the ECU 21B determines the preceding vehicle 601 based on at least the detection results of the preceding vehicle 601 by the camera 31B and the radar 32B. In this processing, the ECU 21B functions as an object recognition unit. Each of the detection results of the preceding vehicle 601 by the camera 31B and the radar 32B can include the same information as that of the detection result of the preceding vehicle 601 by the camera 31A. Instead of the ECU 21B, for example, the ECU 20A may perform step S502. Steps S501 and S502 may be executed in reverse order or executed parallelly.

In step S503, the ECU 21A calculates the difference between the detection results by the camera 31A and the LiDAR 32A. In this processing, the ECU 21A functions as a calculation unit. For example, if each detection result includes the distance between the vehicle V and the preceding vehicle 601, the ECU 21A calculates the difference between the distance detected by the camera 31A and that detected by the LiDAR 32A. In another example, if each detection result includes the speed of the preceding vehicle 601, the ECU 21A calculates the distance between the speed detected by the camera 31A and that detected by the LiDAR 32A. Instead of the ECU 21A, for example, the ECU 20A may perform step S503.

In step S504, the ECU 21B calculates the difference between the detection results by the camera 31B and the radar 32B. In this processing, the ECU 21B functions as a calculation unit. For example, if each detection result includes the distance between the vehicle V and the preceding vehicle 601, the ECU 21B calculates the difference between the distance detected by the camera 31B and that detected by the radar 32B. In another example, if each detection result includes the speed of the preceding vehicle 601, the ECU 21B calculates the distance between the speed detected by the camera 31B and that detected by the radar 32B. Instead of the ECU 21B, for example, the ECU 20A may perform step S504. Steps S503 and S504 may be executed in reverse order or executed parallelly.

In step S505, the ECU 20A determines whether there is a predetermined variation between the detection result by the camera 31A or the LiDAR 32A and that by the camera 31B or the radar 32B. For example, the ECU 20A determines whether there is a predetermined variation between the detection results by the camera 31A and the camera 31B. The ECU 20A may determine that there is a variation when one of the detection results is 95% or less or 105% or more of the other detection result. If there is a variation (YES in step S505), the process advances to step S506; otherwise (NO in step S505), the process advances to step S508.

In step S508, the ECU 20A recognizes the preceding vehicle 601 by further integrating the determination results in steps S501 and S502. In this processing, the ECU 20A functions as an object recognition unit. The preceding vehicle 601 may be recognized based on either of the determination results. For example, the use of the determination result in step S501 may be preset. In step S508, the ECU 20A may recognize the preceding vehicle 601 based on one of the determination results in steps S501 and S502.

In step S506, the ECU 20A decides the reliabilities of the determination results in steps S501 and S502 based on the calculation results in steps S503 and S504. In this processing, the ECU 20A functions as a reliability determination unit. For example, the ECU 20A may set the ratio of the difference to one detection result as the reliability of the determination result in step S501. The same applies to the reliability of the determination result in step S502 based on the calculation result in step S504.

For example, assume that the distance to the preceding vehicle 601, which has been detected by the camera 31A, is 95 m, and the distance to the preceding vehicle 601, which has been detected by the LiDAR 32A, is 105 m. In this case, the calculation result in step S503 indicates 10 m which is the difference between the distances. Therefore, the ECU 20A sets "10/95" as the reliability of the determination result in step S501. Similarly, assume that the distance to the preceding vehicle 601, which has been detected by the camera 31B, is 95 m, and the distance to the preceding vehicle 601, which has been detected by the radar 32B, is 100 m. In this case, the ECU 20A sets "5/95" as the reliability of the determination result in step S502.

In step S507, the ECU 20A determines whether the reliability decided in step S506 satisfies a predetermined condition. The predetermined condition is a condition for determining that the use of the determination result in step S501 or S502 for control of the vehicle V is inappropriate. For example, if at least one reliability exceeds a predetermined threshold, the ECU 20A determines that the predetermined condition is satisfied. If the predetermined condition is satisfied (YES in step S507), the process advances to step S509; otherwise (NO in step S507), the process advances to step S508.

In step S509, the ECU 20A recognizes the preceding vehicle 601 based on not the determination result by one of the ECUs 21B and 21A with the lower reliability but the determination result by one of the ECUs 21B and 21A with the higher reliability. The reliability decided in step S506 is inversely proportional to a detection error between the two sensors (for example, the camera 31A and the LiDAR 32A). Therefore, since the low reliability indicates that the detection error is large, it is possible to control the vehicle V more accurately by recognizing the object without using the determination results of the object by these sensors. In the above method, determination may be performed using an object within a predetermined range (for example, a range of 30 m to 50 m when calculating the difference between the distances) excellent in detection accuracies (for example, an error in detected distance) of the sensors.

Summary of Embodiment

[Arrangement 1]

There is provided an object recognition apparatus (1) for recognizing an object (601), comprising:

a first object determination unit (21A) configured to determine the object based on at least detection results of the object by a first sensor (31A) and a second sensor (32A);

a second object determination unit (21B) configured to determine the object based on at least detection results of the object by a third sensor (31B) and a fourth sensor (32B);

an object recognition unit (20A) configured to recognize the object based on a determination result by at least one of the first object determination unit or the second object determination unit;

a first calculation unit (20A) configured to calculate a difference between the detection result by the first sensor and the detection result by the second sensor;

a second calculation unit (20A) configured to calculate a difference between the detection result by the third sensor and the detection result by the fourth sensor; and a reliability decision unit (20A) configured to decide reliabilities of the determination results by the first object determination unit and the second object determination unit based on calculation results by the first calculation unit and the second calculation unit.

According to this arrangement, it is possible to perform object recognition with high reliability.

[Arrangement 2]

There is provided the object recognition apparatus according to arrangement 1, wherein if the reliability of the determination result by at least one of the first object determination unit or the second object determination unit satisfies a predetermined condition, the object recognition unit recognizes the object based on not the determination result by the object determination unit with the lower reliability but the determination result by the object determination unit with the higher reliability.

According to this arrangement, it is possible to perform object recognition based on an object determination unit with higher reliability.

[Arrangement 3]

There is provided the object recognition apparatus according to arrangement 1 or 2, wherein the first sensor and the third sensor have the same detection characteristic.

According to this arrangement, it is possible to compare reliabilities with reference to sensors having the same detection characteristic.

[Arrangement 4]

There is provided the object recognition apparatus according to any one of arrangements 1 to 3, wherein if there is a predetermined variation between the detection result by one of the first sensor and the second sensor and the detection result by one of the third sensor and the fourth sensor, the reliability decision unit decides the reliability.

According to this arrangement, when the reliability is considered to be low, it is possible to decide the reliability.

[Arrangement 5]

There is provided the object recognition apparatus according to any one of arrangements 1 to 4, wherein each of the first sensor and the third sensor is a camera (31A, 31B), the second sensor is a LiDAR (32A), and the fourth sensor is a radar (32B).

According to this arrangement, the reliability is decided based on a difference in detection result between sensors having different characteristics.

[Arrangement 6]

There is provided a vehicle (V) comprising:

an object recognition apparatus (1) defined in any one of arrangements 1 to 5;

a first sensor, a second sensor, a third sensor, and a fourth sensor; and an actuator group (83).

According to this arrangement, there is provided a vehicle capable of performing object recognition with high reliability.

[Arrangement 7]

There is provided a method for recognizing an object (601), comprising:

determining (S501) the object based on at least detection results of the object by a first sensor (31A) and a second sensor (32A);

determining (S502) the object based on at least detection results of the object by a third sensor (31B) and a fourth sensor (32B);

recognizing (S508, S509) the object based on a determination result in at least one of the determining the object based on at least the detection results of the object by the first sensor and the second sensor or the determining the object based on at least the detection results of the object by the third sensor and the fourth sensor;

calculating (S503) a difference between the detection result by the first sensor and the detection result by the second sensor;

calculating (S504) a difference between the detection result by the third sensor and the detection result by the fourth sensor; and deciding (S506), based on calculation results in the calculating the difference between the detection result by the first sensor and the detection result by the second sensor and the calculating the difference between the detection result by the third sensor and the detection result by the fourth sensor, reliabilities of the determination results in the determining the object based on at least the detection results of the object by the first sensor and the second sensor and the determining the object based on at least the detection results of the object by the third sensor and the fourth sensor.

According to this arrangement, it is possible to perform object recognition with high reliability.

The present invention is not limited to the above embodiment, and various changes and modifications can be made without departing from the spirit and scope of the invention. Therefore, to apprise the public of the scope of the present invention, the following claims are appended.

What is claimed is:

1. An object recognition apparatus for recognizing an object, comprising:

a first object determination unit configured to determine the object based on at least a first detection result of the object by a first sensor and a second detection result of the object by a second sensor and not based on a third detection result of the object by a third sensor and a fourth detection result of the object by a fourth sensor;

a second object determination unit configured to determine the object based on at least the third detection result of the object by the third sensor and the fourth detection result of the object by the fourth sensor and not based on the first detection result of the object by the first sensor and the second detection result of the object by the second sensor;

an object recognition unit configured to recognize the object based on at least one of a first determination result by the first object determination unit or a second determination result by the second object determination unit;

a first calculation unit configured to calculate a first difference between the first detection result by the first sensor and the second detection result by the second sensor;

a second calculation unit configured to calculate a second difference between the third detection result by the third sensor and the fourth detection result by the fourth sensor; and a decision unit configured to decide a first ratio of the first difference to the first detection result or the second detection result and a second ratio of the second difference to the third detection result or the fourth detection result, wherein the object recognition unit is further configured to select, based on the first ratio and the second ratio, at least one of the first determination result or the second determination result to recognize the object.

2. The apparatus according to claim 1, wherein when at least one of the first ratio or the second ratio satisfies a predetermined condition, the object recognition unit recognizes the object based on the first determination result and the second determination result having a smaller value of the first ratio and the second ratio.

3. The apparatus according to claim 1, wherein the first sensor and the third sensor are of a similar type.

4. The apparatus according to claim 1, wherein when there is a predetermined variation between the detection result by one of the first sensor and the second sensor and the detection result by one of the third sensor and the fourth sensor, the decision unit decides the first ratio and the second ratio.

5. The apparatus according to claim 1, wherein
each of the first sensor and the third sensor is a camera, the second sensor is a LiDAR, and
the fourth sensor is a radar.

6. A vehicle comprising:
an object recognition apparatus defined in claim 1;
a first sensor, a second sensor, a third sensor, and a fourth sensor; and
an actuator group.

7. The apparatus according to claim 1, wherein the first sensor, the second sensor, the third sensor, and the fourth sensor are separate sensors.

8. A method for recognizing an object, comprising:

determining the object based on at least a first detection result of the object by a first sensor and a second detection result of the object by a second sensor and not based on a third detection result of the object by a third sensor and a fourth detection result of the object by a fourth sensor;

determining the object based on at least the third detection result of the object by the third sensor and the fourth detection result of the object by the fourth sensor and not based on the first detection result of the object by the first sensor and the second detection result of the object by the second sensor;

recognizing the object based on at least one of a first determination result in the determining the object based on at least the first detection result of the object by the first sensor and the second detection result of the object by the second sensor or a second determination result in the determining the object based on at least the third detection result of the object by the third sensor and the fourth detection result of the object by the fourth sensor;

calculating a first difference between the first detection result by the first sensor and the second detection result by the second sensor;

calculating a second difference between the third detection result by the third sensor and the fourth detection result by the fourth sensor; and deciding a first ratio of the first difference to the first detection result or the second detection result and a second ratio of the second difference to the third detection result or the fourth detection result, wherein at least one of the first determination result or the second determination result is selected to select based on the first ratio and the second ratio to recognize the object.

* * * * *